US012768206B2

(12) United States Patent
Tang

(10) Patent No.: US 12,768,206 B2
(45) Date of Patent: Oct. 20, 2026

(54) FLIP-IN VEHICLE DOOR HANDLE, VEHICLE DOOR, AND VEHICLE

(71) Applicants: Zhejiang ZEEKR Intelligent Technology Co., Ltd., Ningbo (CN); Zhejiang Geely Holding Group Co., Ltd., Hangzhou (CN)

(72) Inventor: Xintao Tang, Ningbo (CN)

(73) Assignees: Zhejiang ZEEKR Intelligent Technology Co., Ltd., Ningbo (CN); Zhejiang GEELY Holding Group Co., Ltd., Hangzhou (CN)

( * ) Notice: Subject to any disclaimer, the term of this patent is extended or adjusted under 35 U.S.C. 154(b) by 0 days.

(21) Appl. No.: 18/963,865

(22) Filed: Nov. 29, 2024

(65) Prior Publication Data

US 2025/0092722 A1 Mar. 20, 2025

Related U.S. Application Data

(63) Continuation of application No. PCT/CN2023/116536, filed on Sep. 1, 2023.

(30) Foreign Application Priority Data

Sep. 2, 2022 (CN) ......................... 202211094538.4

(51) Int. Cl.
*E05B 85/10* (2014.01)
*E05B 85/18* (2014.01)

(52) U.S. Cl.
CPC ............ *E05B 85/103* (2013.01); *E05B 85/18* (2013.01)

(58) Field of Classification Search
CPC ........ E05B 85/103; E05B 85/18; E05B 81/28; E05B 81/76; E05B 81/77; E05B 85/107; E05B 79/06; E05B 85/10
See application file for complete search history.

(56) References Cited

U.S. PATENT DOCUMENTS 5,560,659 A * 10/1996 Dault ....................... E05B 85/18 292/336.3
9,518,410 B2 * 12/2016 Vasi ........................ E05B 81/08
(Continued)

FOREIGN PATENT DOCUMENTS

CN 110206419 A 9/2019
CN 112576122 * 3/2021 ............ E05B 79/06
(Continued)

OTHER PUBLICATIONS

Office Action in related Chinese Application No. 202211094538.4 dated Dec. 19, 2024 (12 pages).
(Continued)

*Primary Examiner* — Kristina R Fulton
*Assistant Examiner* — Thomas L Neubauer
(74) *Attorney, Agent, or Firm* — Bayes PLLC

(57) ABSTRACT

A flip-in vehicle door handle includes a handle base, a grip, a linear driving apparatus, and a linkage mechanism. A grip installing groove is provided on the handle base, and the grip is installed in the grip installing groove and is rotatably connected to the handle base. The linear driving apparatus is provided on the handle base. The linkage mechanism is rotatably installed on the handle base. A driving input end of the linkage mechanism is hinged to a linear moving driving end of the linear driving apparatus. An action output end is in sliding connection with the grip. When the linear driving apparatus is started, the linkage mechanism is driven to drive the grip blocked in the grip installing groove to rotate towards an inner side of the handle base, so as to expose the grip installing groove.

20 Claims, 7 Drawing Sheets

(56) References Cited

U.S. PATENT DOCUMENTS

| | | | |
|---|---|---|---|
| 2005/0230982 | A1 | 10/2005 | Lee |
| 2015/0167348 | A1 | 6/2015 | Choi |
| 2015/0315812 | A1 | 11/2015 | Vasi et al. |
| 2021/0332619 | A1 | 10/2021 | Peterson et al. |
| 2022/0090420 | A1 | 3/2022 | Kadlec et al. |

FOREIGN PATENT DOCUMENTS

| | | | |
|---|---|---|---|
| CN | 112576122 | A | 3/2021 |
| CN | 113090142 | A | 7/2021 |
| CN | 216406465 | U | 4/2022 |
| CN | 216974484 | U | 7/2022 |
| CN | 115162866 | A | 10/2022 |
| CN | 115559621 | A | 1/2023 |
| DE | 102013109930 | A1 | 3/2015 |
| DE | 102017126168 | A1 | 6/2018 |
| DE | 102019207935 | A1 | 12/2020 |
| EP | 2664734 | A2 | 11/2013 |
| JP | 1983121958 | U | 8/1983 |
| JP | 201495251 | A | 5/2014 |
| JP | 2015533964 | A | 11/2015 |
| JP | 2017101398 | A | 6/2017 |
| JP | 201990196 | A | 6/2019 |
| KR | 20090064667 | A | 6/2009 |
| KR | 20200025511 | A | 3/2020 |
| WO | 2007144287 | A1 | 12/2007 |

OTHER PUBLICATIONS

International Search Report and Written Opinion issued in related International Application No. PCT/CN2023/116536 dated Dec. 4, 2023 (14 pages).

Office Action in related Chinese Application No. 202211094538.4 dated Apr. 29, 2025 (6 pages).

Extended European Search Report in related European Application No. 23859499.8 dated Dec. 8, 2025 (9 pages).

Notice of Allowance in related Japanese Application No. 2024-570453 dated Oct. 30, 2025 (5 pages).

* cited by examiner

FLIP-IN VEHICLE DOOR HANDLE, VEHICLE DOOR, AND VEHICLE

CROSS-REFERENCE TO RELATED APPLICATIONS

This application is a continuation of International Application No. PCT/CN2023/116536, filed on Sep. 1, 2023, which claims the benefit of priority to Chinese Application No. 202211094538.4, filed on Sep. 2, 2022, both of which are hereby incorporated by reference in their entireties.

TECHNICAL FIELD

The present disclosure relates to the technical field of vehicle components, and in particular to a flip-in vehicle handle, a vehicle door, and a vehicle.

BACKGROUND

At present, when the hidden-type flip-out handles on the market are opened, the grip operating portions all protrude from an outer door panel. When the grip operating portion protrudes from the outer door panel, the occupant pulls the grip operating portion to open the vehicle door.

SUMMARY

The present disclosure provides a flip-in vehicle door handle, including a handle base, a grip, a linear driving apparatus, and a linkage mechanism; the handle base is provided with a grip installing groove, the grip is installed in the grip installing groove, and is rotatably connected to the handle base; the linear driving apparatus is provided on the handle base, the linkage mechanism is rotatably installed on the handle base, a driving input end of the linkage mechanism is hinged to a linear moving driving end of the linear driving apparatus, and an action output end of the linkage mechanism is in sliding connection with the grip; where, when the linear driving apparatus is started, the linkage mechanism is driven to drive the grip blocked on the grip installing groove to rotate toward an inner side of the handle base, so as to expose the grip installing groove.

In an example of the present disclosure, the linear driving apparatus includes an electric actuator and a pushing rod, the pushing rod is connected to an output end of the electric actuator, and the pushing rod is driven by the electric actuator to perform linear reciprocating movement.

In an example of the present disclosure, the handle base is provided with a first accommodating cavity and a slide channel, the electric actuator is installed in the first accommodating cavity, and the slide channel is provided at a side of the output end of the electric actuator, and the pushing rod makes linear reciprocating movement along the slide channel.

In an example of the present disclosure, the linkage mechanism includes a first link and a second link, the first link is fixedly connected to the second link to form a V-shaped pivot arm, an intersection of the first link and the second link is rotatably installed on the handle base, an end of the first link facing away from the intersection is in sliding connection with the grip, and an end of the second link facing away from the intersection is hinged to the pushing rod.

In an example of the present disclosure, a first shaft sleeve and a second shaft sleeve protruding towards a side of the handle base are provided at the intersection of the first link and the second link, the first shaft sleeve is provided on a periphery of the second shaft sleeve, a third shaft sleeve is correspondingly provided on the handle base, and the third shaft sleeve is inserted into the second shaft sleeve and fixed by a first rotating shaft.

In an example of the present disclosure, a first torsion spring is provided at a connection between the linkage mechanism and the handle base, and the first torsion spring is sleeved on the second shaft sleeve, two ends of the first torsion spring are respectively fixed to the first shaft sleeve and the handle base.

In an example of the present disclosure, a clamping groove is provided at a position where the first link is connected to the grip, a first connecting seat cooperated with the clamping groove is provided on the grip, the grip is in sliding connection with the first link by a cooperation of the first connecting seat and the clamping groove.

In an example of the present disclosure, a grip installing seat is provided below a position of the handle base corresponding to the grip installing groove, second connecting seats are provided at both ends of the grip, the grip installing seat is rotatably connected to the second connecting seat through a second rotating shaft.

In an example of the present disclosure, a second torsion spring is provided on the second rotating shaft, and the second torsion spring is sleeved on the second rotating shaft, and two torsion output ends of the second torsion spring are respectively connected to the second connecting seat.

In an example of the present disclosure, the flip-in vehicle door handle further includes an unlatching switch, the unlatching switch is provided above the grip installing groove and is electrically connected to a control module.

In an example of the present disclosure, a sealing apparatus is provided between the grip and the grip installing groove, and the sealing apparatus is circumferentially provided along an outer edge of the grip installing groove.

In an example of the present disclosure, the flip-in vehicle door handle further includes a grip back cover, and the grip back cover is installed on the handle base.

Another aspect of the present disclosure provides a vehicle door, which includes an outer door panel and the flip-in vehicle door handle of the present disclosure, and the flip-in vehicle door handle is installed on the outer door panel.

The present disclosure also provides a vehicle, which includes the vehicle door of the present disclosure or the flip-in vehicle door handle of the present disclosure.

BRIEF DESCRIPTION OF DRAWINGS

In order to explain the technical solutions in embodiments of the present disclosure more clearly, the drawings needed to be used in the description of the embodiments will be briefly introduced below. Obviously, the drawings in the following description are only some embodiments of the present disclosure. For those of ordinary skill in the art, other drawings can be obtained based on these drawings without exerting creative efforts.

DETAILED DESCRIPTIONS

Figure 1:
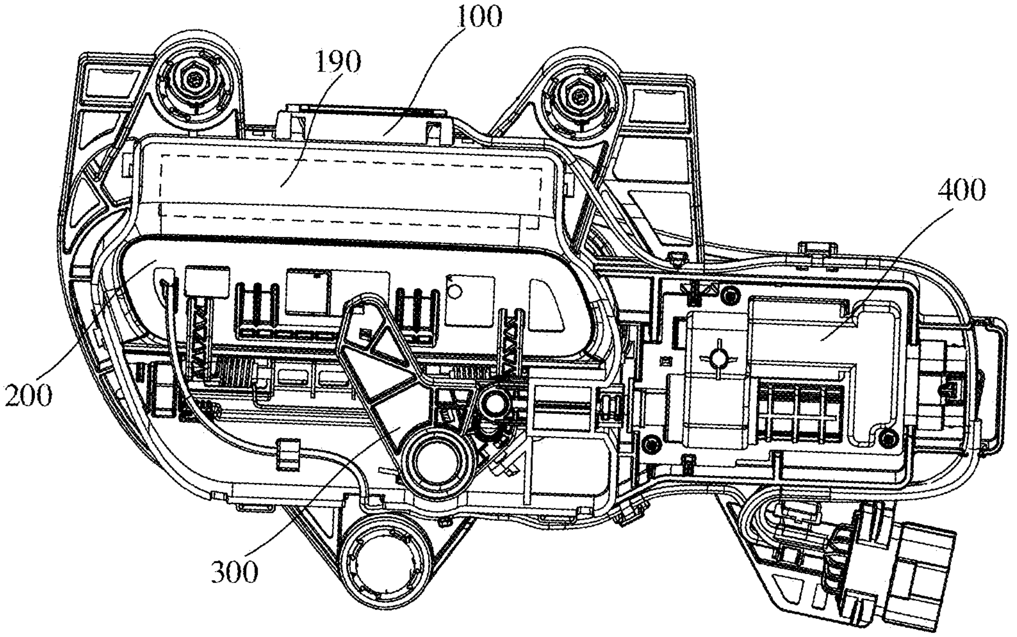
FIG. 1 is a schematic structural diagram of a flip-in vehicle door handle in an embodiment of the present disclosure.

The following describes the implementations of the present disclosure through specific embodiments. Those skilled in the art can easily understand other advantages and effects of the present disclosure from the disclosure of this specification. The present disclosure can also be implemented or applied through other different specific implementations, and various details in this specification can also be modified or changed in various ways based on different viewpoints and applications without departing from the spirit of the present disclosure. It should be noted that, as long as there is no conflict, the following embodiments and the features therein can be combined with each other. It should also be understood that the terminology used in the embodiments of the present disclosure is for describing specific embodiments and is not intended to limit the scope of the present disclosure. Test methods without specifying specific conditions in the following embodiments usually follow conventional conditions or conditions recommended by each manufacturer.

It should be noted that terms such as "upper," "lower", "left," "right," "middle," and "one" cited in this specification are only for convenience of description and are not used to limit the scope that can be implemented by the present disclosure, changes or adjustments in the relative relationships thereof, without substantially changing the technical solutions, shall also be regarded as the scope that can be implemented by the present disclosure.

This type of hidden-type handle has the grip operating portion protruding from the outer door panel; the grip portion is prone to collision and damage, and the maintenance cost is high. Moreover, an overall Y-direction size of a flip-out handle assembly is large (approximately 65 mm), which requires large space for arrangement and is difficult to arrange. Therefore, there is a need to develop a flip-in handle to solve the above problems.

In view of the above shortcomings, the present disclosure provides a flip-in vehicle handle, a vehicle door, and a vehicle to solve the problem of collision and damage to a grip portion caused by a grip operating portion protruding from the vehicle door outer panel.

In order to achieve the above objects and other related objects, the present disclosure provides a flip-in vehicle handle as described herein in detail. The flip-in vehicle door handle of the present disclosure uses a linkage mechanism to convert the linear movement of the linear driving apparatus into a rotary movement, and then drives the grip to turn inside the vehicle door to realize a flip-in contraction of the grip, which solves the problem that the grip is prone to collision and damage when popping out of the vehicle and compresses the overall Y-direction layout space of the handle at the same time, optimizing the structure of the vehicle door handle and reducing costs.

The linkage mechanism in the present disclosure adopts a V-shaped pivot arm structure, which can not only achieve rotational connection with the handle base, but also be hinged with the grip and the linear driving apparatus. The linear movement of the pushing rod of the linear driving apparatus drives the rotating arm to rotate around the rotating shaft. Since the rotating arm is connected to the grip, the rotation of the rotating arm drives the grip to rotate to the inside of the grip installing groove, thereby realizing the force transmission of the linear driving apparatus; the linkage mechanism and the connection between the grip and the handle base are provided with torsion springs, which can make the linkage mechanism and grip always maintain resilience and have a tendency to return to their initial position.

Referring to FIG. 1 to FIG. 14, the present disclosure provides a flip-in vehicle door handle, a vehicle door and a vehicle to solve the problem that the grip is prone to collision and damage when popping out from the vehicle.

Figure 2:
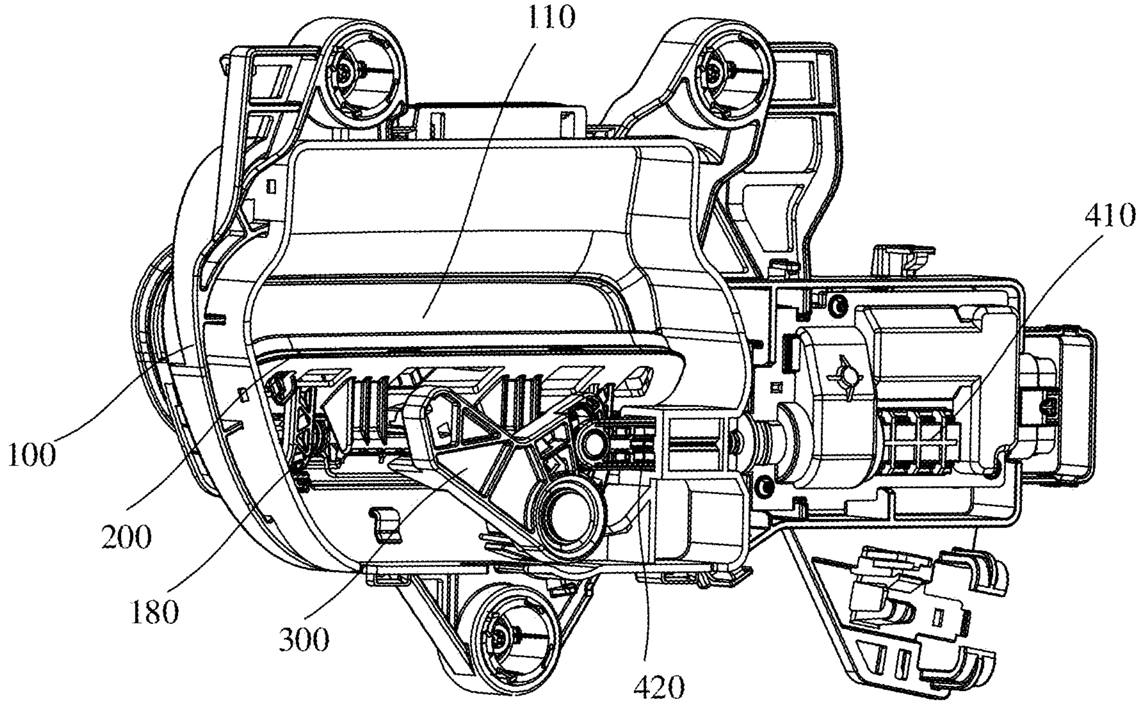
FIG. 2 is a schematic structural diagram of a flip-in vehicle door handle after a grip is flipped in an embodiment of the present disclosure.

Please refer to FIG. 1 and FIG. 2, the flip-in vehicle door handle of the present disclosure includes a handle base 100, a grip 200, a linkage mechanism 300, and a linear driving apparatus 400. The handle base 100 is provided with a grip installing groove 110, and the grip 200 is installed in the grip installing groove 110 and is rotatably connected with the handle base 100; the linear driving apparatus 400 is disposed on the handle base 100 for driving the grip 200 to rotate; the linkage mechanism 300 is rotatably installed on the handle base 100, and a driving input end of the linkage mechanism 300 is hinged to a linear moving driving end of the linear driving apparatus 400, and an action output end of the linkage mechanism 300 is in sliding connection with the grip 200. When the vehicle door is in a closed state, the grip 200 covers the grip installing groove 110 and is flush with an outer door panel; when the linear driving apparatus 400 is started, the linear driving apparatus 400 drives the grip 200 covering the grip installing groove 110 through the linkage mechanism 300 to rotate towards an inner side of the handle base 100, so as to expose the grip installing groove.

Figure 3:
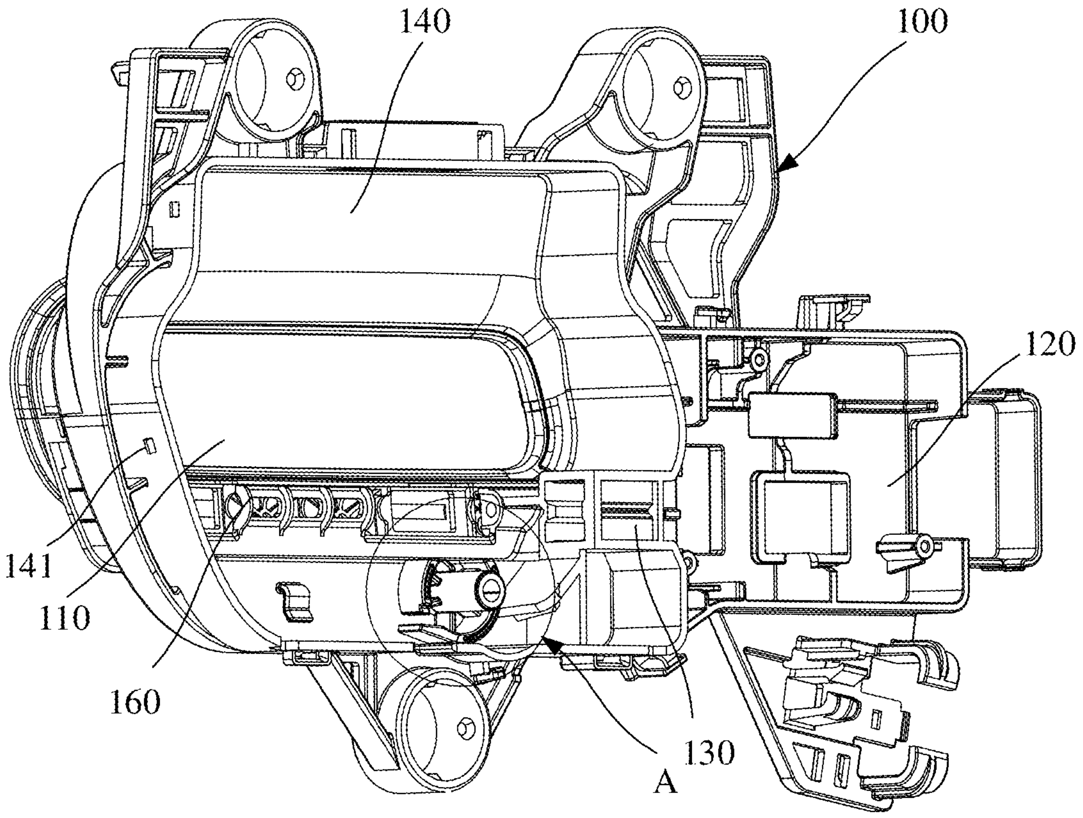
FIG. 3 is a schematic structural diagram of a handle base of a flip-in vehicle door handle in an embodiment of the present disclosure.

Please refer to FIG. 2 and FIG. 3, in an embodiment, the linear driving apparatus 400 includes an electric actuator 410 and a pushing rod 420. The pushing rod 420 is installed at an output end of the electric actuator 410. The electric actuator 410 outputs a linear driving force, and the pushing rod 420 makes linear reciprocating movement driven by the electric actuator 410. In the present embodiment, the handle base 100 is composed of a bottom plate and side plates located around the bottom plate to form a box-shaped cavity. One side of the box-shaped cavity is provided with a first accommodating cavity 120 for installing the electric actuator and a slide channel 130 for the pushing rod 420 to slide. The other side of the box-shaped cavity is provided with a second accommodating cavity 140, and the second accommodating cavity 140 is used to install the linkage mechanism 300 and the grip 200. The electric actuator 410 is installed in the first accommodating cavity 120 through a fastener. The slide channel 130 is provided at the output end of the electric actuator 410. The slide channel 130 is provided transversely along the handle base 100. The pushing rod 420 makes linear reciprocating movement in the slide channel 130, under the action of the electric actuator 410. The linkage mechanism 300 is installed at a positon of the second accommodating cavity 140 corresponding to the slide channel 130. The linear movement of the pushing rod 420 can drive the linkage mechanism 300 to rotate, thereby driving the grip 200 to flip toward the inner side of the handle base 100. Conventional actuator assemblies in the art can be used as the electric actuator 410 in the present embodiment, the specific structure of which will not be repeated herein. In other embodiments, existing linear driving apparatuses with other structures may be used, for example, a driving motor and a turbine worm transmission assembly that cooperates with the driving motor. The turbine worm transmission assembly can convert a rotary movement of the driving motor into a linear movement.

Figure 5:
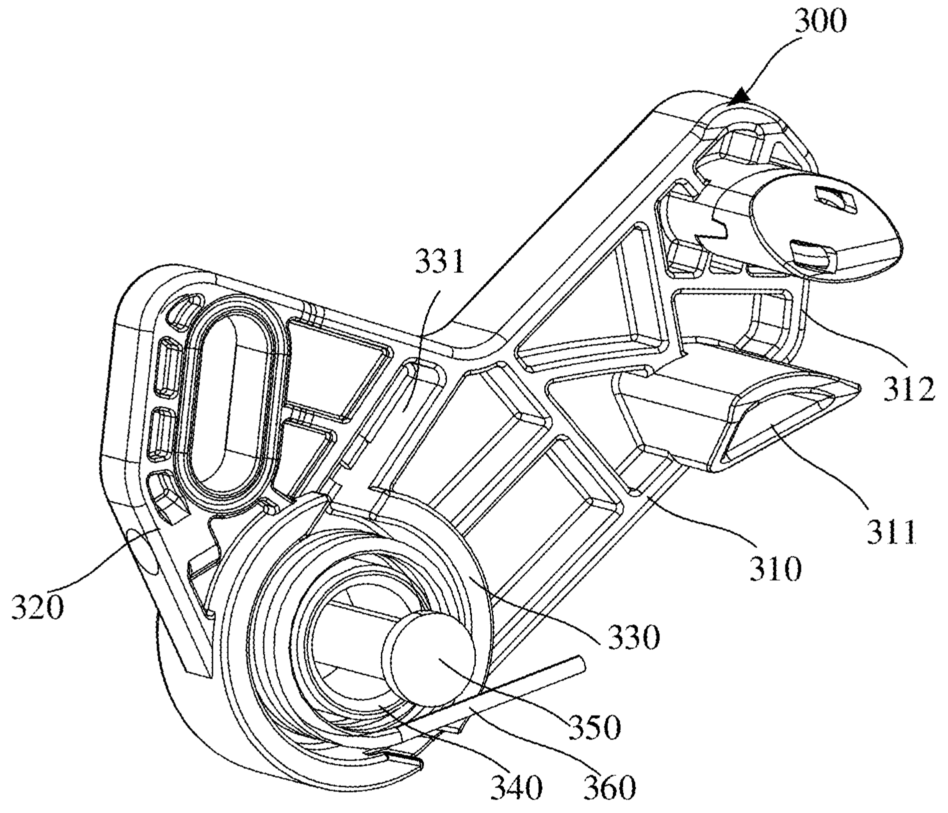
FIG. 5 is a schematic structural diagram of a linkage mechanism of a flip-in vehicle door handle in an embodiment of the present disclosure.
Figure 6:
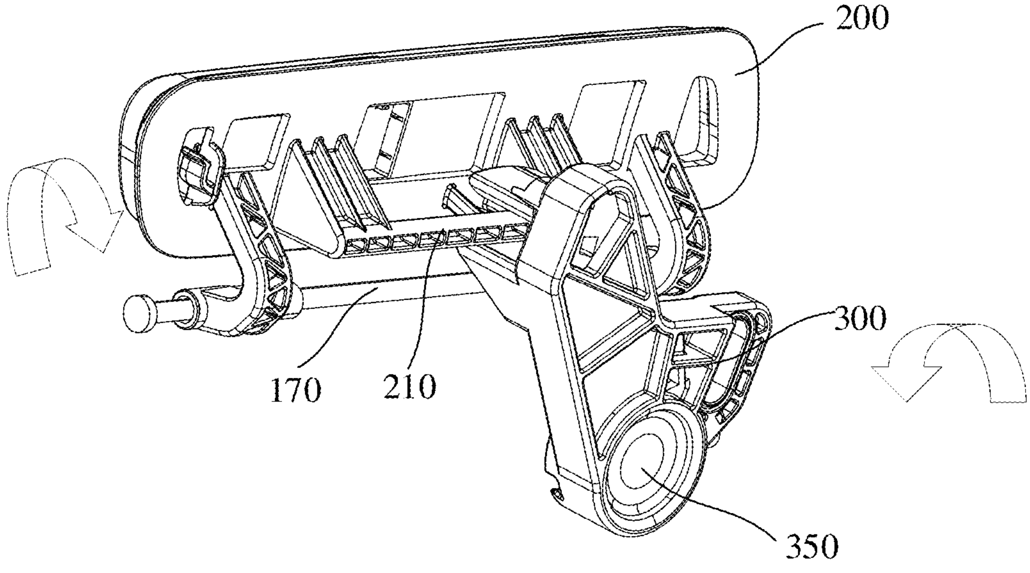
FIG. 6 is a schematic diagram of cooperation between a grip and a linkage mechanism of a flip-in vehicle door handle in an embodiment of the present disclosure.
Figure 7:
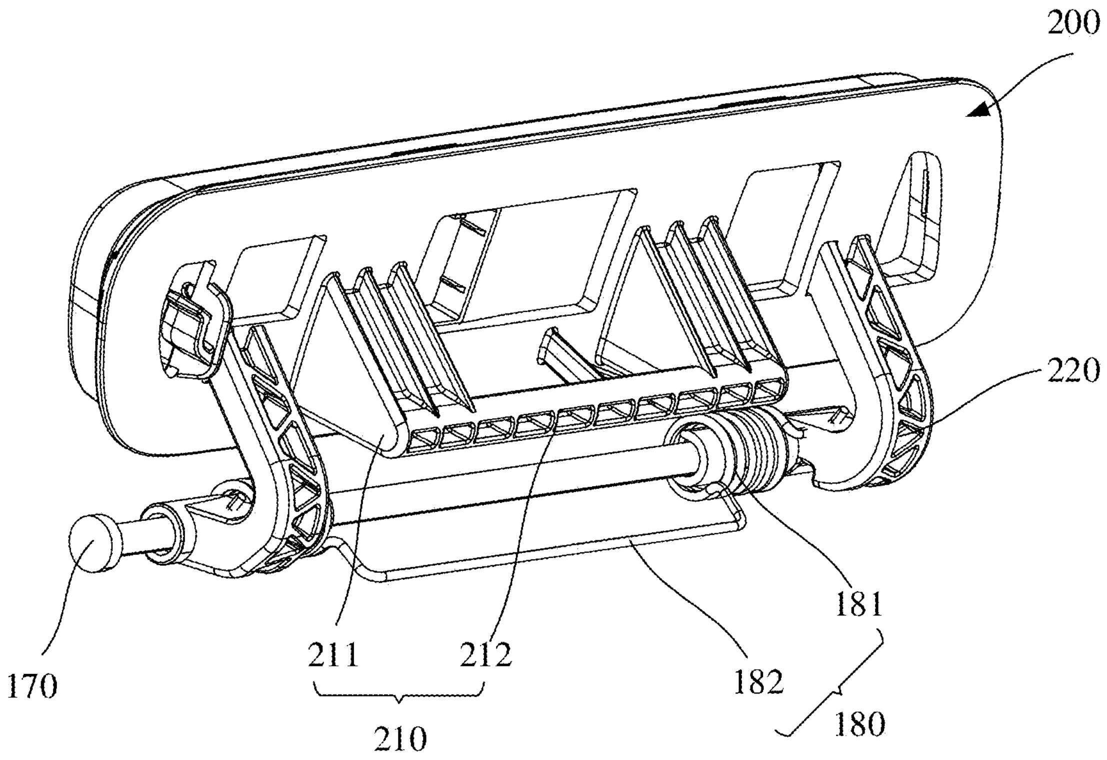
FIG. 7 is a schematic structural diagram of a grip of a flip-in vehicle door handle in an embodiment of the present disclosure.
Figure 8:
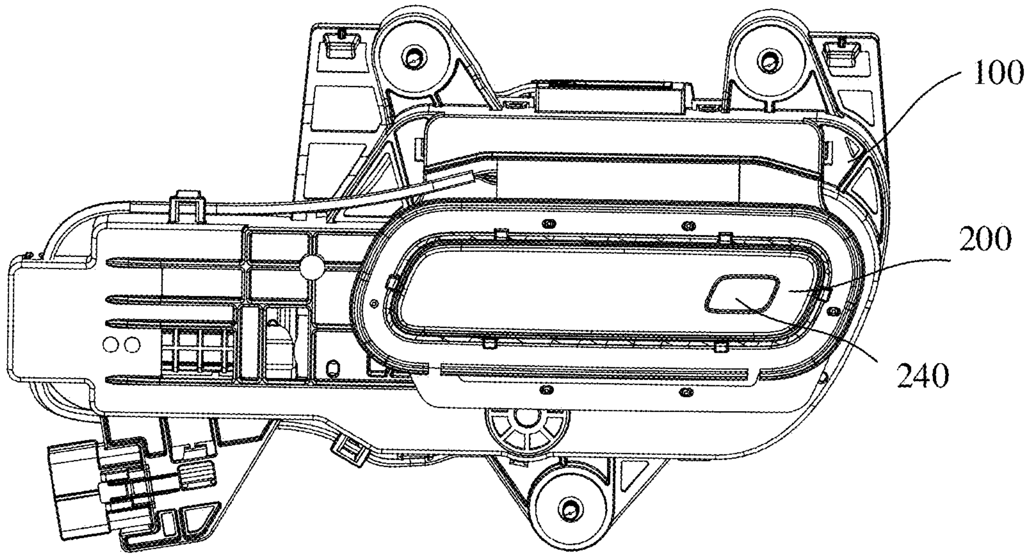
FIG. 8 is a schematic diagram of an external structure of a flip-in vehicle door handle when it is in a closed state in the present disclosure.
Figure 9:
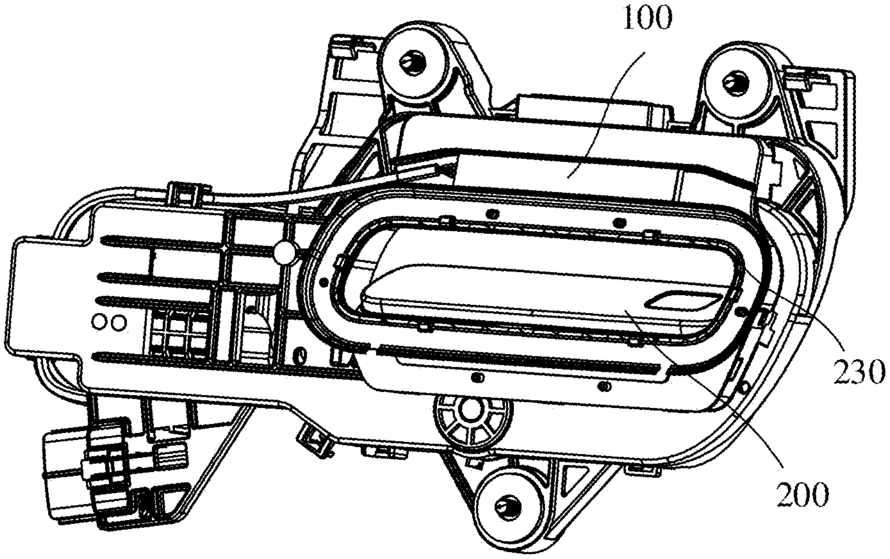
FIG. 9 is a schematic diagram of an external structure of a flip-in vehicle door handle when it is in an open state in the present disclosure.
Figure 10:
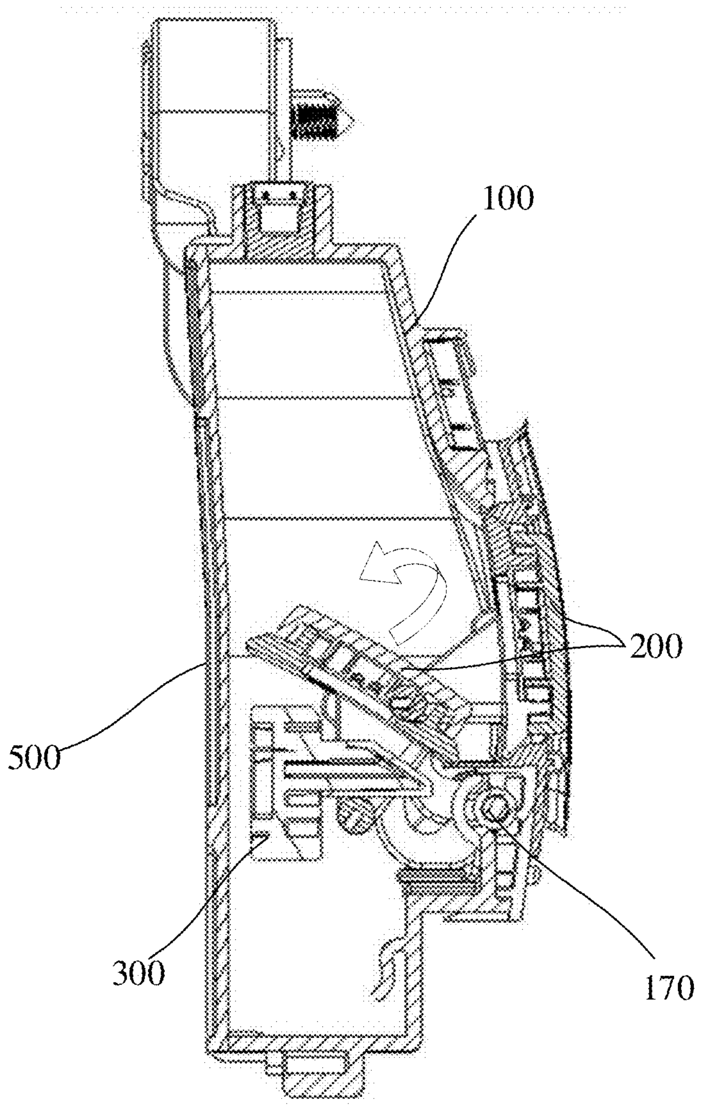
FIG. 10 is a schematic diagram of a process from a closed state to an open state of a flip-in vehicle door handle in the present disclosure.
Figure 11:
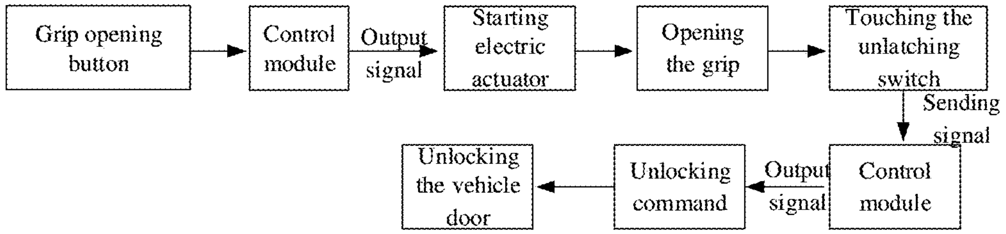
FIG. 11 is a schematic diagram of a principle of opening and unlatching a flip-in vehicle door handle in the present disclosure.

Please refer to FIG. 5 to FIG. 7, where the directions indicated by the arrows in FIG. 6 respectively represent rotation directions of the linkage mechanism and the grip. In an embodiment, the linkage mechanism 300 includes a first link 310 and a second link 320. The first link 310 is fixedly connected to the second link 320 to form a V-shaped pivot arm. The intersection of the first link 310 and the second link 320 is rotatably installed to the handle base 100. In other embodiments, the first link 310 and the second link 320 may also be an integrated structure. An end of the first link 310 away from the intersection of the first link 310 and the second link 320 is the action output end of the linkage mechanism 300. The action output end is in a sliding connection with the grip 200. For example, a protrusion 311 is provided on one side of the first link 310 facing the grip 200, and a clamping groove 312 is provided inside the protrusion 311. A corresponding position of the grip 200 is provided with a first connecting seat 210 that cooperates with the clamping groove 312. The protrusion 311 can be two oppositely arranged bumps, and a gap between the two bumps forms the clamping groove 312; the protrusion 311 can also be an integrated structure, with a clamping groove 312 in the middle thereof. Here, the formation mode of the clamping groove 312 is not limited. The first connecting seat 210 protrudes from an inner surface of the grip 200. For example, the first connecting seat 210 includes two spaced seat bodies 211 and a cross beam 212 connecting the two seat bodies. For example, the seat body 211 is in a triangular prism structure, where the cross beam 212 is provided on the seat body 211, and the two ends of the cross beam 212 are connected to the two seat bodies 211 respectively. The first connection seat 210 and the grip 200 can be an integrated structure or a separated connection structure. The cross beam 212 is always clamped in the clamping groove 312, and a longitudinal size of the cross beam 212 is smaller than an opening size of the clamping groove 312, so that the cross beam 212 and the groove 110 form a sliding pair. As the linkage mechanism 300 rotates, the first link 310 slides along the cross beam 212 and at the same time drives the grip 200 to flip inward.

Please refer to FIG. 2, FIG. 5, and FIG. 8 to FIG. 10. The arrow in FIG. 10 indicates a rotation direction of the grip from a closed state to an open state. The end of the second link 320 away from the intersection of the first link 310 and the second link 320 is a power input end of the linkage mechanism 300, and the power input end is hinged to the pushing rod 420. For example, one end of the pushing rod 420 is fixedly connected to the output end of the electric actuator 410, and the other end is provided with a clamping groove. The second link 320 is inserted into the clamping groove and is hinged with the pushing rod 420 through a pin. The electric actuator 410 drives the pushing rod 420 to make linear movement forward (in a direction away from the electric actuator 410). The pushing rod 420 drives the linkage mechanism 300 to rotate counterclockwise. As the linkage mechanism 300 rotates, the first link 310 slides along the cross beam 212 of the first connecting seat 210, and at the same time presses the grip 200 downward to flip the grip 200 toward the inner side of the handle base 100, so that the grip 200 changes from the closed position to the open position. Similarly, when the electric actuator 410 drives the pushing rod 420 to make a linear movement backward (in a direction towards the electric actuator 410), the pushing rod 420 drives the linkage mechanism 300 to rotate clockwise. As the linkage mechanism 300 rotates, the first link 310 slides in the opposite direction along the cross beam 212 and at the same time pushes the grip 200 upward, and the grip 200 returns from the open position to the closed position. The linkage mechanism 300 adopts a V-shaped pivot arm structure, which can not only ensure the normal rotation movement of the linkage mechanism, but also transmit the linear movement of the pushing rod 420 to the grip 200 so that it can flip towards the inner side of the handle base and reset to be flush with the outer door panel.

Figure 4:
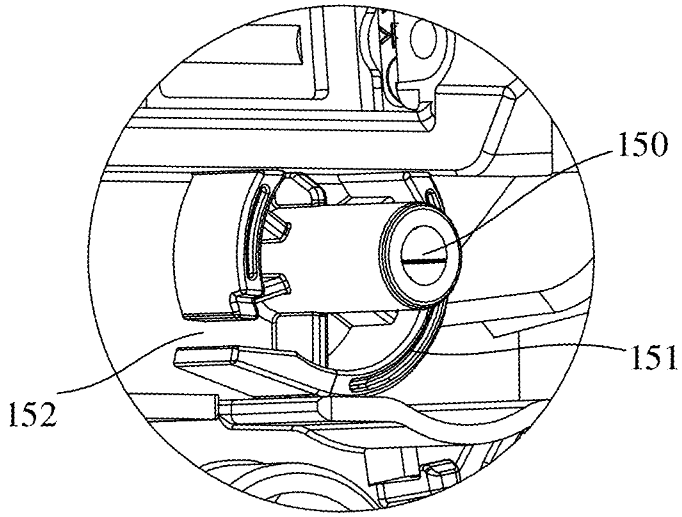
FIG. 4 is an enlarged structural diagram of area A in FIG. 3.

Please refer to FIG. 3 to FIG. 5, in an embodiment, the linkage mechanism 300 is rotatably connected to the handle base 100 through a first rotating shaft 350. Specifically, the intersection of the first link 310 and the second link 320 is provided with a first shaft sleeve 330 and a second shaft sleeve 340 protruding towards the handle base 100. The first shaft sleeve 330 is provided on a periphery of the second shaft sleeve 340, and forms an annular shaft sleeve with the second shaft sleeve 340. The handle base 100 is correspondingly provided with a third shaft sleeve 150 protruding from the handle base 100. An outer diameter of the third shaft sleeve 150 matches an inner diameter of the second shaft sleeve 340, and an inner diameter of the third shaft sleeve 150 matches an outer diameter of the first rotating shaft 350, the third shaft sleeve 150 is inserted into the second shaft sleeve 340 to achieve rotational connection through the first rotating shaft 350. For example, a torsion spring is also provided at a connection between the linkage mechanism 300 and the handle base 100, where the torsion spring is referred to a first torsion spring 360. The first torsion spring 360 is installed between the first shaft sleeve 330 and the second shaft sleeve 340, two ends of the first torsion spring 360 are connected to the handle base 100 and the linkage mechanism 300, respectively. For example, a first installing groove 331 is provided on a side wall of the first shaft sleeve 330, a shaft sleeve fixing seat 151 is provided on a periphery of the third shaft sleeve 150, and a second installing groove 152 is provided on a side wall of the shaft sleeve fixing seat 151, the first torsion spring 360 is accommodated in space between the first shaft sleeve 330 and the second shaft sleeve

340, and is sleeved on the second shaft sleeve 340. Two ends of the first torsion spring 360 are respectively accommodated in the first installing groove 331 and the second installing groove 152. The arrangement of the first torsion spring 360 allows the linkage mechanism to always maintain resilience and have a tendency to return to an initial position.

Please refer to FIG. 2, FIG. 3, FIG. 6, FIG. 7 and FIG. 9, in an embodiment, the grip installing groove 110 is provided on a bottom plate of the handle base 100, and located above the linkage mechanism 300. The inside cavity of the grip installing groove 110 provides avoiding space for flipping the grip 200. The grip 200 is installed in the grip installing groove 110 and is rotatably connected to the handle base 100 through a second rotating shaft 170. Specifically, a position of the handle base 100 corresponding to that below the grip installing groove 110 is provided with a grip installing seat 160. The grip installing seat 160 includes an end portion and a middle portion, and both the end portion and the middle portion are provided with through holes for the rotating shaft to pass through. A second connecting seat 220 is provided on one side of the grip 200. The second connecting seat 220 is an arched structure, one end of the arched structure is fixed on the grip 200, and the other end is provided with a through hole for the rotating shaft to pass through. The second rotating shaft 170 passes through the through holes on the grip installing seat 160 and the second connecting seat 220 to connect them together. When the linkage mechanism 300 rotates around the first rotating shaft 350 driven by the pushing rod 420, the grip 200 is driven to rotate around the second rotating shaft 170, so that the grip 200 can be flipped inward or returned to the initial position by flipping. For example, a sealing structure 230 is provided between the grip 200 and the grip installing groove 110. The sealing structure 230 can be a sealing ring arranged along the circumference of the grip installing groove 110. When the grip 200 is in a closed state, the sealing ring can seal a gap between the handle base 100 and grip 200.

Please refer to FIG. 3 and FIG. 7, for example, a torsion spring is provided at the connection between the grip 200 and the handle base 100. The torsion spring is referred to as a second torsion spring 180. The second torsion spring 180 includes two torque output portions 181 and a connecting portion 182 connecting the two torque output portions 181. The two torque output portions 181 are respectively sleeved on the second connecting seats 220 at both ends of the grip 200, and an output end of the torque output portion 181 is fixed on the second connecting seat 220, the connecting portion 182 bypasses a bottom of the middle portion of the grip installing seat 160. The arrangement of the second torsion spring 180 allows the grip 200 to always maintain resilience and have a tendency to return to the initial position. In other embodiments, two torsion springs may also be used, the two torsion springs are respectively sleeved on the second rotating shaft, and the two ends of the torsion spring are respectively fixed on the second connecting seat 220 and the grip installing seat 160.

Please refer to FIG. 1, FIG. 2, FIG. 8, FIG. 10, and FIG. 11, in an embodiment, an unlatching switch 190 is provided in the handle base 100, and a grip opening button 240 is provided on an outside of the grip 200. The unlatching switch 190 and the grip opening button 240 are respectively in signal communication with a control module, for example, DCM (Data Communication Module) or BCM (Body Control Module), to realize the touch unlocking function for vehicle door handle. The unlatching switch 190 may be an unlatching capacitor or a push-type switch. The unlatching switch 190 is set at a position that can be touched by the hand after the grip 200 is opened. For example, the unlatching switch 190 is set at a position above a corresponding grip installing groove 110 so that the unlatching switch 190 can be touched in time after the grip 200 is opened. The unlatching process of the vehicle door is as follows: when a user approaches the vehicle and touches the grip opening button 240 on the grip 200 by a hand, the control module DCM or BCM controls the electric actuator 410 to start after receiving a signal, so that the pushing rod 420 pushes the linkage mechanism 300 to rotate, the linkage mechanism 300 drives the grip 200 to flip toward an inner side of the vehicle door, exposing the grip installing groove 110. The user's hand reaches into the grip installing groove 110 to touch the unlatching switch 190 in the handle base 100. The unlatching switch 190 sends a door lock release signal to the control module. The control module sends an unlatching command to the door lock, realizing the unlatching of vehicle door lock.

Figure 12:
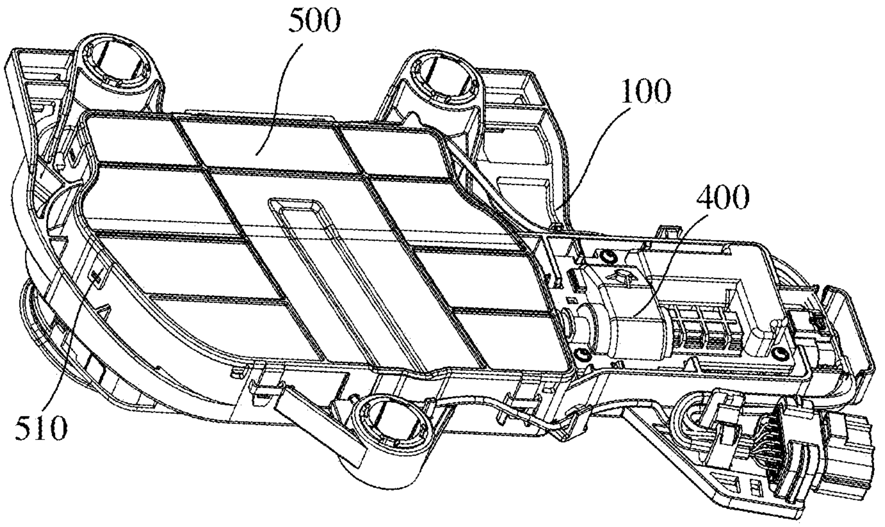
FIG. 12 is a schematic structural diagram of a flip-in vehicle door handle from another angle in the present disclosure.

Please refer to FIG. 3 and FIG. 12, a hidden-type vehicle door handle of the present disclosure also includes a grip back cover 500. The grip back cover 500 is covered on the second accommodating cavity 140 and is connected to the handle base 100. For example, a positioning protrusion 141 is provided on a side wall of the second accommodating cavity 140. A buckle 510 that cooperates with the positioning protrusion 141 is provided at a corresponding position of the grip back cover 500, and the connection between the grip back cover 500, and the handle base 100 is achieved by cooperating the positioning protrusion 141 with the buckle 510. The grip back cover 500 is used to seal the grip 200 and the linkage mechanism 300 in the second accommodating cavity 140.

Figure 13:
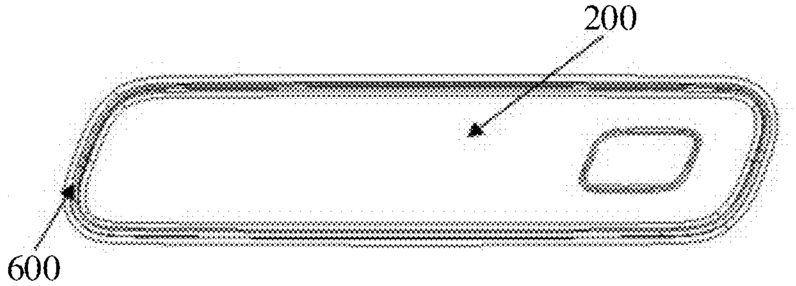
FIG. 13 is a schematic structural diagram of a vehicle door when a flip-in vehicle door handle is in a closed state in the present disclosure.
Figure 14:
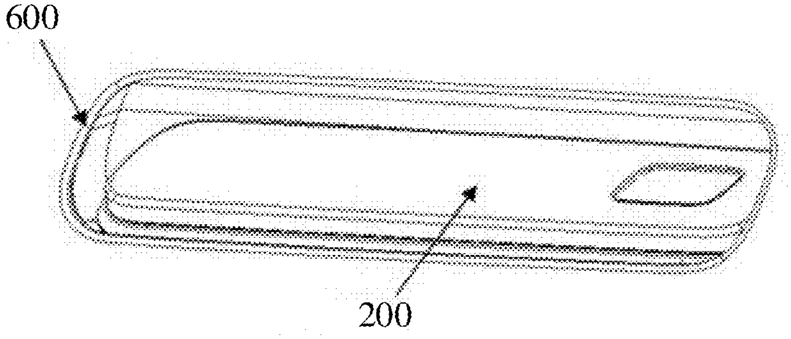
FIG. 14 is a schematic structural diagram of a vehicle door when a flip-in vehicle door handle is in an open state in the present disclosure.

Please refer to FIG. 13 and FIG. 14, the present disclosure also provides a vehicle door, which includes an outer door panel 600 and a vehicle door handle installed on the outer door panel 600, where the vehicle door handle is a flip-in vehicle door handle as described above in the present disclosure. A handle installation hole is provided on the outer door panel 600, a handle base of the flip-in vehicle door handle is fixed inside the outer door panel 600, and the grip can block the handle installation hole. In the initial position, the handle is in a closed state, and the grip 200 covers the grip installing groove 110 and is flush with the outer door panel 600; when the handle is opened, the grip 200 flips toward the inside of the vehicle door to prevent the grip 200 from popping out from the vehicle door and causing collision damage.

The present disclosure also provides a vehicle, which includes a vehicle body (not shown in the figure), a vehicle door installed on both sides of the vehicle body, and a vehicle door handle installed on the vehicle door, where the vehicle door is the vehicle door described above in the present disclosure, and the vehicle door handle is the flip-in vehicle door handle mentioned above in the present disclosure. The specific structure can be referred to in the above description and will not be described in detail here.

The structures of the vehicle door handle, the vehicle door and the vehicle that are not described in detail in the present disclosure can all be realized by the existing technology in this field.

The present disclosure provides a flip-in vehicle handle, a vehicle door, and a vehicle, in which a linkage mechanism is used to convert a linear movement of the linear driving apparatus into a rotary movement, thereby driving the handle to flip toward the inside of the vehicle door to realize the flip-in contraction of the grip, thereby solving the risk of collision and damage caused by the grip popping out of the car. At the same time, the overall Y-direction layout space of the handle is compressed, the structure of the vehicle door handle is optimized, and the cost is reduced. Therefore, the present disclosure effectively overcomes some practical problems in the prior art and has high utilization value and usage significance. Therefore, the present disclosure effectively overcomes some practical problems in the prior art and has high utilization value and usage significance.

The above embodiments only illustrate the principles and effects of the present disclosure, but are not intended to limit the present disclosure. Those skilled in the art can modify or change the above embodiments without departing from the spirit and scope of the present disclosure. Therefore, all equivalent modifications or changes made by those skilled in the art without departing from the spirit and technical ideas disclosed in the present disclosure shall fall into the protection scope of the claims of the present disclosure.

What is claimed is:

1. A flip-in vehicle door handle, comprising:
- a handle base, with a grip installing groove provided on the handle base;
- a grip, installed in the grip installing groove and rotatably connected to the handle base;
- a linear driving apparatus, provided on the handle base; and
- a linkage mechanism, comprising a first link and a second link fixedly connected to the first link to form a V-shaped pivot arm, an intersection of the first link and the second link being rotatably installed on the handle base, wherein
- a driving input end of the linkage mechanism is hinged to a linear moving driving end of the linear driving apparatus, the driving input end of the linkage mechanism being an end of the second link;
- an action output end of the linkage mechanism is in sliding connection with the grip, the action output end of the linkage mechanism being an end of the first link; and
- when the linear driving apparatus is started, the linkage mechanism is driven to drive the grip disposed in the grip installing groove to rotate toward an inner side of the handle base, so as to expose the grip installing groove.

2. The flip-in vehicle door handle according to claim 1, wherein
- the linear driving apparatus comprises an electric actuator and a pushing rod;
- the pushing rod is connected to an output end of the electric actuator; and
- the pushing rod is driven by the electric actuator to perform linear reciprocating movement.

3. The flip-in vehicle door handle according to claim 2, wherein
- the handle base is provided with a first accommodating cavity and a slide channel;
- the electric actuator is installed in the first accommodating cavity;
- the slide channel is provided on a side of the output end of the electric actuator; and
- the pushing rod is configured to perform the linear reciprocating movement along the slide channel.

4. The flip-in vehicle door handle according to claim 2, wherein
- the end of the first link facing away from the intersection is in sliding connection with the grip; and
- the end of the second link facing away from the intersection is hinged to the pushing rod.

5. The flip-in vehicle door handle according to claim 4, wherein
- a first shaft sleeve and a second shaft sleeve protruding towards a side of the handle base are provided at the intersection of the first link and the second link;
- the first shaft sleeve is provided on a periphery of the second shaft sleeve;
- a third shaft sleeve is correspondingly provided on the handle base; and
- the third shaft sleeve is inserted into the second shaft sleeve and fixed by a first rotating shaft.

6. The flip-in vehicle door handle according to claim 5, wherein
- a first torsion spring is provided at a connection between the linkage mechanism and the handle base;
- the first torsion spring is sleeved on the second shaft sleeve; and
- two ends of the first torsion spring are respectively fixed to the first shaft sleeve and the handle base.

7. The flip-in vehicle door handle according to claim 4, wherein
- a clamping groove is provided at a position where the first link is connected to the grip;
- a first connecting seat cooperated with the clamping groove is provided on the grip; and
- the grip is in sliding connection with the first link by a cooperation of the first connecting seat and the clamping groove.

8. The flip-in vehicle door handle according to claim 1, wherein
- a grip installing seat is provided below a position of the handle base corresponding to the grip installing groove;
- second connecting seats are provided at both ends of the grip; and
- the grip installing seat is rotatably connected to the second connecting seats through a second rotating shaft.

9. The flip-in vehicle door handle according to claim 8, wherein
- a second torsion spring is provided on the second rotating shaft;
- the second torsion spring is sleeved on the second rotating shaft; and
- two torsion output ends of the second torsion spring are respectively connected to the second connecting seats.

10. The flip-in vehicle door handle according to claim 1, further comprising an unlatching switch provided above the grip installing groove and electrically connected to a control module.

11. The flip-in vehicle door handle according to claim 1, wherein
- a sealing apparatus is provided between the grip and the grip installing groove; and
- the sealing apparatus is circumferentially provided along an outer edge of the grip installing groove.

12. A vehicle door, comprising:
- an outer door panel; and
- a flip-in vehicle door handle installed on the outer door panel and comprising:
  - a handle base, with a grip installing groove provided on the handle base;
  - a grip, installed in the grip installing groove and rotatably connected to the handle base;
  - a linear driving apparatus, provided on the handle base; and a linkage mechanism, comprising a first link and a second link fixedly connected to the first link to form a V-shaped pivot arm, an intersection of the first link and the second link being rotatably installed on the handle base, wherein a driving input end of the linkage mechanism is hinged to a linear moving driving end of the linear driving apparatus, the driving input end of the linkage mechanism being an end of the second link;

an action output end of the linkage mechanism is in sliding connection with the grip, the action output end of the linkage mechanism being an end of the first link; and when the linear driving apparatus is started, the linkage mechanism is driven to drive the grip disposed in the grip installing groove to rotate toward an inner side of the handle base, so as to expose the grip installing groove.

13. The vehicle door according to claim 12, wherein the linear driving apparatus comprises an electric actuator and a pushing rod;

the pushing rod is connected to an output end of the electric actuator; and the pushing rod is driven by the electric actuator to perform linear reciprocating movement.

14. The vehicle door according to claim 13, wherein a grip installing seat is provided below a position of the handle base corresponding to the grip installing groove;

second connecting seats are provided at both ends of the grip; and the grip installing seat is rotatably connected to the second connecting seats through a second rotating shaft.

15. The vehicle door according to claim 12, wherein the flip-in vehicle door handle further comprises an unlatching switch provided above the grip installing groove and electrically connected to a control module.

16. The vehicle door according to claim 12, wherein a sealing apparatus is provided between the grip and the grip installing groove; and the sealing apparatus is circumferentially provided along an outer edge of the grip installing groove.

17. A vehicle, comprising:

an outer door panel; and a flip-in vehicle door handle installed on the outer door panel and comprising:

a handle base, with a grip installing groove provided on the handle base;

a grip, installed in the grip installing groove and rotatably connected to the handle base;

a linear driving apparatus, provided on the handle base; and a linkage mechanism, comprising a first link and a second link fixedly connected to the first link to form a V-shaped pivot arm, an intersection of the first link and the second link being rotatably installed on the handle base, wherein a driving input end of the linkage mechanism is hinged to a linear moving driving end of the linear driving apparatus, the driving input end of the linkage mechanism being an end of the second link;

an action output end of the linkage mechanism is in sliding connection with the grip, the action output end of the linkage mechanism being an end of the first link; and when the linear driving apparatus is started, the linkage mechanism is driven to drive the grip disposed in the grip installing groove to rotate toward an inner side of the handle base, so as to expose the grip installing groove.

18. The vehicle according to claim 17, wherein the linear driving apparatus comprises an electric actuator and a pushing rod;

the pushing rod is connected to an output end of the electric actuator; and the pushing rod is driven by the electric actuator to perform linear reciprocating movement.

19. The vehicle according to claim 17, wherein a grip installing seat is provided below a position of the handle base corresponding to the grip installing groove;

second connecting seats are provided at both ends of the grip; and the grip installing seat is rotatably connected to the second connecting seats through a second rotating shaft.

20. The vehicle according to claim 17, wherein the flip-in vehicle door handle further comprises an unlatching switch provided above the grip installing groove and electrically connected to a control module.

* * * * *